Oct. 30, 1928.
W. J. HAWKINS
1,689,386
MOLDED ARTICLE AND METHOD OF MAKING THE SAME
Filed April 18, 1927
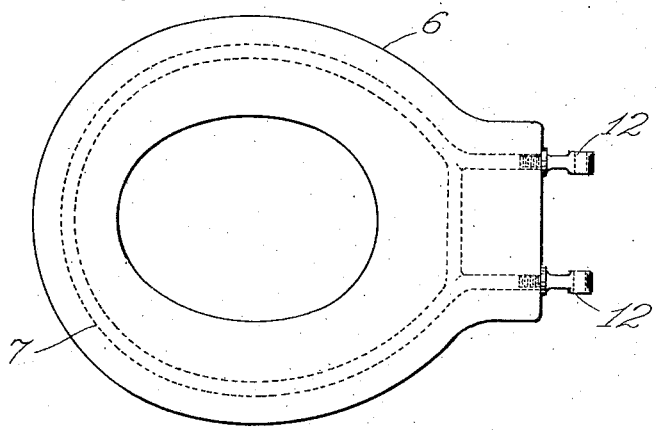
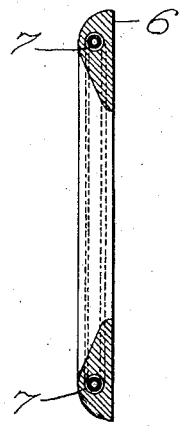
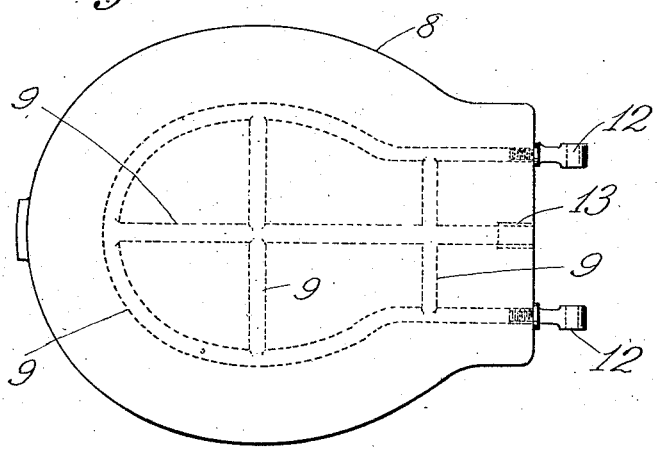
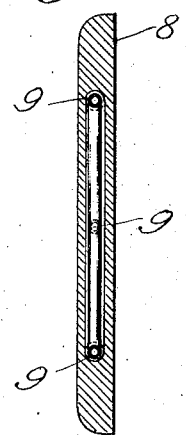
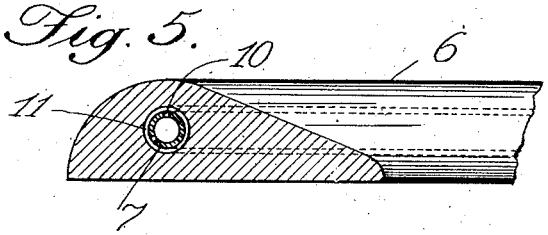
INVENTOR
Wilford J. Hawkins
BY
Sydney Prescott
ATTORNEY Patented Oct. 30, 1928.

1,689,386

UNITED STATES PATENT OFFICE.

WILFORD J. HAWKINS, OF MONTCLAIR, NEW JERSEY, ASSIGNOR TO AMERICAN MACHINE & FOUNDRY COMPANY, A CORPORATION OF NEW JERSEY.

MOLDED ARTICLE AND METHOD OF MAKING THE SAME.

Application filed April 18, 1927. Serial No. 184,499.

This invention relates to an improvement in molded articles and methods of making the same, particularly articles made of casein, pyroxylin or other plastic material requiring curing or seasoning after formation.

Articles made of such plastic materials, after being formed by the application of heat, moisture and pressure, are cured by immersion in a suitable curing agent such as formaldehyde, pucric acid solution, etc. In case of relatively thick articles, the curing process, even when the solution is kept in continual agitation, requires a very long time, often a year or more; and it is the main object of the present invention to reduce the curing time to a fraction of the time hitherto required. With this and other objects not specifically mentioned in view, the invention consists in certain constructions, combinations, and methods which will be hereinafter fully described and then specifically set forth in the claims hereunto appended.

In the accompanying drawings in which like characters of reference indicate the same or like parts, Fig. 1 is a plan view of a seat of plastic material constructed in accordance with the invention; Fig. 2 is a cross-sectional view of the same; Figs. 3 and 4 are similar views of a cover for the seat shown in Fig. 1; and Fig. 5 is an enlarged cross-sectional view of the thickest part of the seat shown in Fig. 1.

In carrying the invention into effect, there is produced a molded article comprising a body of plastic material provided with means whereby a curing agent may be directed to the interior of the material in order to cause the curing agent to simultaneously act on the exterior and interior of the material to shorten the curing time. In the best constructions contemplated, there is further provided for this purpose a tubular metallic structure which is embedded in and reinforces the material, and means for anchoring the article. The body of the article, the structure embedded therein, and the curing agent, may be varied within the scope of the claims, for the specific structure selected to illustrate the invention is but one of numerous possible concrete embodiments of the same. The invention, therefore, is not to be restricted to the precise details of the structure shown and described.

In producing an annular article such as the seat 6 shown in Figs. 1 and 2, the embedded structure is in the form of a tube 7 bent to conform with the shape of the article, and it is molded in the article in such a manner that it will occupy a substantially central position in the thickest part of the article.

In producing a solid article such as the cover 8 shown in Figs. 3 and 4, the tubes 9 are arranged to distribute the curing agent evenly throughout the body of the article.

In Fig. 5, which shows the article partially cured, the perforations 10 of the tubes are seen to open into a space 11 formed by shrinkage of the article during the curing process. The shrinkage is exaggerated in the drawings in the interest of clearness of illustration.

The outer ends of the tubes 7 and 9 in the articles shown in Figs. 1 and 2, may be made use of mechanically by tapping them for reception of eyebolts 12 which are thus held much more securely than by attaching them to the plastic material itself. These eyebolts 12 constitute means for anchoring the seat and similarly for anchoring the cover in operative position to swing up and down in the usual manner. When the ends of the tubes are not thus made use of, short sections may be cut out of the material and the holes thus formed filled with plugs 13 of plastic material matching that of the article itself.

During the process of molding the article with a tubular metallic structure embedded therein, the latter is filled with hard wax to prevent the plastic material from entering the same under pressure. After the molding operation is completed, the wax is melted out in order that the curing agent may flow in during the curing operation. In some cases, wires may be embedded in the plastic material during the molding operation and withdrawn prior to the curing operation so that there will be no metallic structure in the finished article. This method is satisfactory where no great strength is required of the finished article.

In this manner, the curing time is cut to a fraction of that hitherto required, and a better product results by reason of a better distribution of the curing agent.

What is claimed is:

1. A molded article comprising a body of plastic material requiring curing after formation and provided with means embedded in said body whereby a liquid curing agent may be directed to the interior of the material.

2. A molded article comprising a body of plastic material requiring curing after formation and provided with means embedded in said body whereby a liquid curing agent may be directed to the interior of the material and the cured material is reinforced.

3. A molded article comprising a body of plastic material requiring curing after formation, and a perforated tubular metallic structure embedded in and reinforcing said material and whereby a curing agent may be directed to the interior of the material.

4. A molded article comprising a body of plastic material requiring curing after formation, a perforated tubular metallic structure embedded in and reinforcing said material and whereby a curing agent may be directed to the interior of the material, and means for anchoring said article.

5. A molded article comprising a body of plastic material requiring curing after formation, a perforated tubular metallic structure embedded in and reinforcing said material and whereby a curing agent may be directed to the interior of the material, and means for movably anchoring said article including eyebolts threaded into said structure.

6. The method of making a molded article of plastic material, which consists in providing means embedded in said article whereby a liquid curing agent may be directed to the interior of the material, then causing said curing agent to simultaneously act on the exterior and interior of the material to shorten the curing time.

7. The method of making a molded article of plastic material, which consists in molding into the interior of the material a perforated tubular metallic structure, then causing a curing agent to simultaneously act on the exterior of the material and through said structure on the interior of the material to shorten the curing time.

8. The method of making a molded article of plastic material, which consists in providing means embedded in said article whereby formaldehyde may be directed to the interior of the material, then causing formaldehyde to simultaneously act on the exterior and interior of the material to shorten the curing time.

9. A molded article comprising a body of plastic material requiring curing after formation, a perforated tubular metallic structure embedded in and reinforcing said material and whereby a curing agent may be directed to the interior of the material, and means for swingably anchoring said article.

In testimony whereof, I have signed my name to this specification.

WILFORD J. HAWKINS.